(12) United States Patent
Dziembowski et al.

(10) Patent No.: US 6,361,586 B1
(45) Date of Patent: Mar. 26, 2002

(54) PROCESS FOR COOLING, DEMONOMERIZING AND DEDUSTING GAS FROM A POLYMER DRIER

(75) Inventors: Kasimir Von Dziembowski, Frankenthal (DE); Howard G. Perryman; Leonard H. Moore, both of Lake Jackson, TX (US)

(73) Assignees: BASF Corporation; BASF Aktiengesellschaft

( * ) Notice: Subject to any disclaimer, the term of this patent is extended or adjusted under 35 U.S.C. 154(b) by 1416 days.

(21) Appl. No.: 08/656,733

(22) Filed: Jun. 3, 1996

Related U.S. Application Data

(63) Continuation of application No. 08/353,425, filed on Dec. 9, 1994, now abandoned, which is a continuation-in-part of application No. 08/302,309, filed on Sep. 8, 1994, now abandoned.

(51) Int. Cl.[7] .............................................. B01D 53/00
(52) U.S. Cl. .............................. 95/196; 95/211; 95/237
(58) Field of Search ........................... 95/211, 210, 237, 95/187, 196, 195, 239, 240; 55/228, 233, 259; 261/94, DIG. 72

(56) References Cited

U.S. PATENT DOCUMENTS

| | | | |
|---|---|---|---|
| 2,952,675 A | * 9/1960 | Bolle | 95/187 |
| 3,047,565 A | * 7/1962 | Brau et al. | 95/187 |
| 3,353,334 A | * 11/1967 | Bergman | 95/196 |
| 3,535,399 A | * 10/1970 | Tabler | 95/211 |
| 3,542,892 A | * 11/1970 | Stoker et al. | 95/187 |
| 4,043,773 A | * 8/1977 | Scoggin | 55/233 |
| 4,425,285 A | * 1/1984 | Shimoi et al. | 55/233 |
| 5,122,321 A | * 6/1992 | Chambers | 95/237 |
| 5,401,297 A | * 3/1995 | Teague et al. | 95/187 |

FOREIGN PATENT DOCUMENTS

| | | |
|---|---|---|
| DE | 3236304 | 4/1984 |
| DE | 3606080 | 8/1987 |
| WO | 89/11073 | 11/1989 |

OTHER PUBLICATIONS

Kirk–Othmer, *Encyclopedia of Chemical Technology*, vol. 1, 1978, Wiley & Sons, New York, pp. 53–55.

* cited by examiner

*Primary Examiner*—Duane S. Smith
(74) *Attorney, Agent, or Firm*—Karen Dellerman; Fernando Borrego

(57) ABSTRACT

A process for cooling, demonomerizing and dedusting gas from a thermoplastic polymer drier includes directing the gas, containing thermoplastic polymer dust, monomers and water, into a packed column with a packing and washing the gas with a solvent.

12 Claims, 2 Drawing Sheets

PROCESS FOR COOLING, DEMONOMERIZING AND DEDUSTING GAS FROM A POLYMER DRIER

CROSS REFERENCE TO RELATED APPLICATIONS

This application is a continuation U.S. patent application Ser. No. 08/353,425, filed Dec. 9, 1994, now abandoned, which was a continuation-in-part of U.S. patent application Ser. No. 08/302,309 filed Sep. 8, 1994, now abandoned.

FIELD OF THE INVENTION

The present invention relates to cooling, demonomerizing and dedusting gas from a thermoplastic polymer drier.

BACKGROUND OF THE INVENTION

At the end of the process for manufacturing certain thermoplastic polymers (like polyamides (nylons), polyesters, polyolefins, polyacrylates, polysulfones, polyethersulfones, polyacetals, polyvinyl-chloride, and polyurethanes) pellets, granules or chips are formed which are often cooled with water. These wet pellets, granules or chips are usually dried in a drier with a gas at an elevated temperature.

It is advantageous to recycle the gas to the drier. However, the gas exiting the drier contains polymer dust, monomers, oligomers and water which have to be separated from the gas in order to recirculate the gas in the drying process. This separation may be performed in several separate steps like a dedusting step (for example in a cyclone or a filter or a combination of both) and a separate cooling step.

The separation efficiency of the cyclone or the filter is not always satisfactory. Dust not separated in the cyclone or filter is deposited in the gas cooler and eventually causes pressure loss in the gas circulation. Monomers not removed deposit on the connecting pipes, e.g., the pipes connecting the polymer drier to the cyclone. Therefore, there remains a need in the manufacture of thermoplastic polymers and other processes where efficient separation of dust and byproducts, such as monomers and oligomers, from gas exposed to such things. There also remains a need to clean such gas in one step.

SUMMARY OF THE INVENTION

Accordingly, the present invention improves efficiency for a process for cooling, demonomerizing and dedusting gas from a thermoplastic polymer drier by directing the gas, containing thermoplastic polymer dust, monomers, oligomers, and water, into a packed column and washing the gas with a solvent.

It is an object of the present invention is to provide a process for cooling, demonomerizing and dedusting gas from a polymer drier all in one step and with high efficiency.

Related objects and advantages of the present invention will be apparent to those of ordinary skill in the art after reading the following detailed description.

DETAILED DESCRIPTION OF THE PREFERRED EMBODIMENTS

To promote an understanding of the principles of the present invention, descriptions of specific embodiments of the invention follow, and specific language describes the same. It will nevertheless be understood that no limitation of the scope of the invention is thereby intended, and that such alterations and further modifications, and such further applications of the principles of the invention discussed are contemplated as would normally occur to one ordinarily skilled in the art to which the invention pertains.

Figure 1:
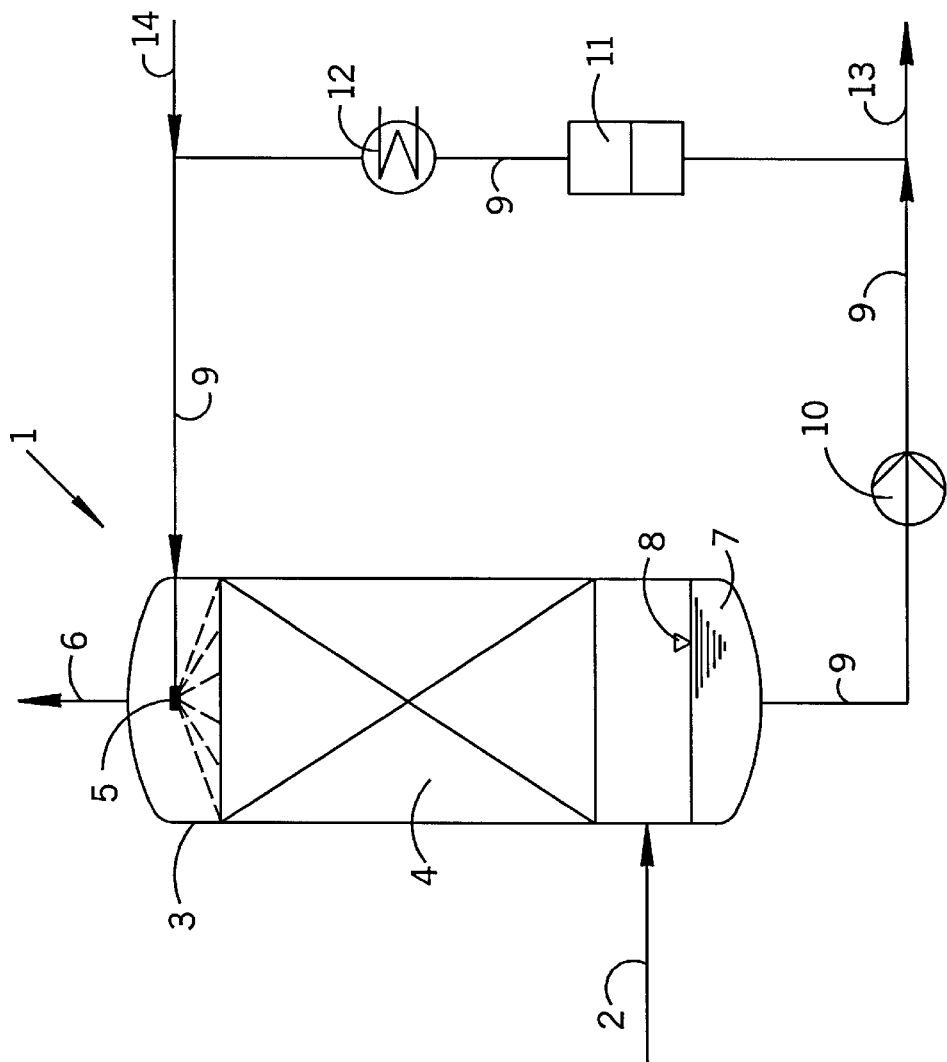
FIG. 1 is a schematic view of a cooling, demonomerizing and dedusting unit according to the present invention.

The present invention is a process for cooling, demonomerizing and dedusting gas from a thermoplastic polymer drier. FIG. 1 schematically shows an exemplary unit useful for practicing the present invention. Cooling, demonomerizing and dedusting unit (1) includes a washing column (3) with packed bed (4) and a recirculation loop with pump (10), filter (11) and cooler (12). An exhaust gas stream from a polymer drier and containing nitrogen, water and polymer dust passes through pipe (2) into washing column (3) of cooling, demonomerizing and dedusting unit (1). Washing column (3) includes a packed bed (4). 2. Packed bed (4) is washed with water which is sprayed from the top of the washing column through spray nozzle (5) onto packed bed (4), thereby washing the exhaust gas stream, which passes from pipe (2) upwardly through packed bed (4). The exhaust gas stream, now washed and substantially free from dust, monomers and oligomers, exits the washing column through pipe (6) and contains nitrogen and water.

The wash water containing washed-out dust, monomers and oligomers is collected in reservoir (7). The level of dust, monomers and oligomers is controlled as desired by level control device (8). The wash-water containing the dust, monomers and oligomers is recirculated through recirculation pipe (9) by pump (10). The dust is filtered out of the water in filter (11). The filtered recirculated water, containing monomers and oligomers is cooled in cooler (12) and recirculated to the top of the washing column, where it is sprayed again through nozzle (5).

Once a desired level in reservoir (7) is reached, the wash water is discharged over pipe (13). Depending on the concentration of recoverable products (e.g., caprolactam monomer), the overflow is directed to recovery for that product or to waste. In the initial phase of the process, water is added to recirculation pipe (9) from a water supply (not shown in FIG. 1) through pipe (14). During the process water comes also from water vapor in the gas stream which enters column (3) through pipe (2). This water condensed from the gas stream is added to reservoir (7).

Packed bed (4) of column (3) is preferably filled with a multiplicity of tellerette packing (15) (shown in FIG. 2), which consists of ring (16) which encompasses spiral (17). Tellerettes are presently preferred because they excellently distribute the solvent, prevent formation of dust deposits and provide a low gas pressure loss.

The specific steps of the process for cooling, demonomerizing, and dedusting gas from a thermoplastic polymer drier are as follows: In step (a) gas from the thermoplastic polymer drier, which gas contains thermoplastic polymer dust, monomers and oligomers from the thermoplastic polymer and water vapor is directed into packing bed (4) of column (3).

Suitable thermoplastic polymers, whose drying gases may be cooled, demonomerized and dedusted according to the process of the present invention include, for example, polyamides, polyesters, polyolefins, polycarbonate, polyacrylonitrile, polyurethane, polysulfone, polyethersulfones, polyvinylchloride, copolymers of these and mixtures of these. The process of the present invention is particularly suitable with polyamides, such as nylon 6 and nylon 6/6, and especially with nylon 6 and copolymers of nylon 6, particularly copolymers of nylon 6 based on terephthalic acid or adipic acid. Suitable polyamides are nylon 6, nylon 6/6, nylon 6/9, nylon 6/10, nylon 6/12, nylon 11, nylon 12, copolymers thereof and mixtures thereof.

Monomers in the gas may include, for example, diamines, ∈-aprolactam, diacids, diols, olefins, vinyl-chlorides, formaldehyde, and the like according to the respective thermoplastic polymer. In addition, oligomers of the respective monomers may be present.

Suitable gases containing thermoplastic polymer dust, monomers and water are air, nitrogen, hydrogen and mixtures thereof. When it enters the column, the gas containing thermoplastic polymer dust, monomers, oligomers and water preferably has a temperature of from about 30 to about 180° C., more preferably from about 50 to about 60° C. The water content of the gas is preferably from about 2% to about 10% by weight, based on the whole gas mixture, more preferably from about 6% to 10% by weight.

Figure 2:
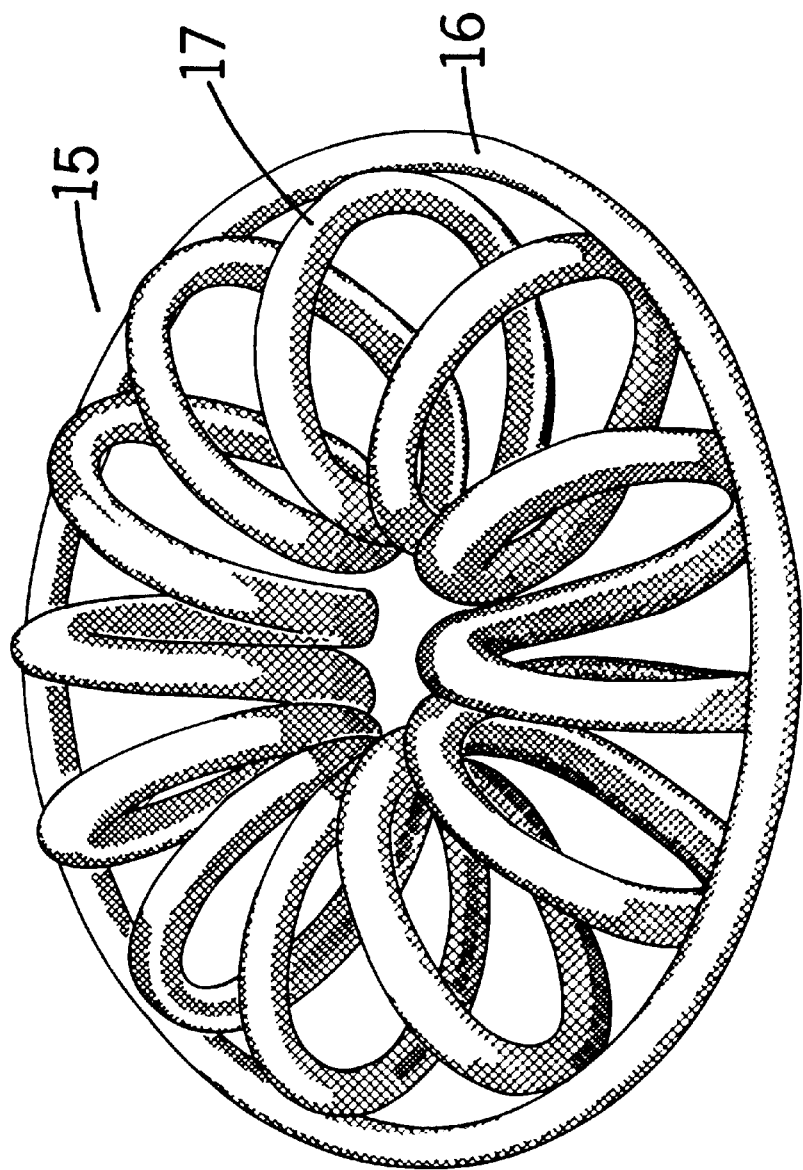
FIG. 2 is a top perspective view of a tellerette packing useful in the unit shown in FIG. 1.

In step (b) the gas, containing the thermoplastic polymer dust, monomers and water is washed with a solvent in the column (3), while passing through packed bed (4). Suitable solvents are, for example, water, alcohols, amines, organic and inorganic acids, esters, ketones, ethers, parafins and mixtures thereof. Water is preferred. The temperature of the solvent coming from spraying nozzle (5) is preferably less than the temperature of the gas. Suitable packing (15) for packing bed (4) are rings, cylinders, and tellerettes. Tellerettes are shown in FIG. 2. Tellerettes are preferred. The packings may be made from a variety of materials, which are inert under the desecribed washing conditions. Such materials include metals, pellets, and ceramics. Suitable metals include carbon steel, stainless steel and titanium. Suitable ceramics include aluminum oxides. Suitable plastics include polyethylene and polypropylene. Of course, other metals, ceramics and plastics might be used.

During this washing step (b), the thermoplastic polymer dust, the monomers and oligomers are washed out of the gas. The washed gas exiting the washing column contains from about 0.01 to about 3.0% by weight (based on the total weight of the washed gas) of monomers and oligomers, and less than 1.0% by weight of thermoplastic polymer dust, preferably less than 0.1% by weight.

Because of the temperature difference between the gas to be washed and the washing solvent, the washing solvent may be heated during the washing of the gas to temperatures of from about 35° C. to about 40° C. This solvent is collected in reservoir (7) from which it is recirculated through pipe (9) by pump (10). In filter (11) dust is filtered from the solvent. Suitable filters include, for example, fiber filters, which are filled with cotton or nylon fibers. The filtered solvent is cooled in cooler (12) to a temperature preferably of from about 10° C. to about the temperature of the supplied gas. Suitable coolers include, for example, a heat exchanger and a cooling tower.

The filtered and cooled solvent is then recirculated for spraying through nozzle (5) in a counterflow against the gas which contains the thermoplastic polymer dust, monomers and water.

This invention will now be described by reference to the following detailed example. The example is set forth by way of illustration, and is not intended to limit the scope of the invention.

EXAMPLE

A gas stream of 16000 Kg N/hour and 1000 Kg water/hour (as steam) from a nylon 6 (rel. vis. 4.08, measured as a 1% by weight solution in $H_2SO4$ at a temperature of 25° C.) drier at a temperature of 65° C. is passed into a column with a packing. The column has a diameter of 2.0 m and a packed bed height of 5 m. For the packing, 2" polypropylene tellerettes are used. The gas stream is washed with 51,000 Kg water/hour of a temperature of 35° C. 375 Kg steam/hour is condensed and dust and monomers are washed out.

The gas stream exiting the column consists of 16,000 Kg/hour nitrogen and 592 Kg/hour water and has a temperature of 35° C. The monomer content is lower than 3% by weight and the nylon 6 dust content is lower than 600 ppm, based on the total weight of the gas mixture. The circulated water which was heated in the column to about 41° C. and is subsequently cooled to 34° C. in the cooler of a recirculation loop. The washed out dust is removed in a screen pack filter at a rate of about 5.5 Kg/day. When the level of dust, monomers and oligomers in the reservoir reaches a desired level, water is discharged out of the recirculation loop over pipe (13) (FIG. 1).

What is claimed is:

1. A process for cooling, demonomerizing and dedusting gas containing thermoplastic polymer dust, monomers and water from a thermoplastic polymer drier, comprising the steps of:
   (a) directing an exhaust stream from a thermoplastic polymer drier, which exhaust stream contains polymer dust, monomers and water into a column which houses a packing;
   (b) within the column, washing the exhaust stream with a solvent selected from the group consisting of water, alcohols, amines, organic and inorganic acids, esters, ketones, ethers, paraffins and mixtures thereof, to achieve substantial cooling, dedusting and demonomerization of the exhaust stream in a single washing step; and
   (c) exiting the substantially cooled, dedusted and demonomerized exhaust stream from the column.

2. The process according to claim 1 wherein the gas is selected from the group consisting of air, nitrogen and mixtures thereof.

3. The process according to claim 2 wherein the gas is nitrogen.

4. The process according to claim 1 wherein the solvent is water.

5. The process according to claim 1 wherein the packing is selected from the group consisting of rings, cylinders, and tellerettes.

6. The process according to claim 5 wherein the packing is a teerette.

7. The process according to claim 5 wherein the packing is made from a elected from the group consisting of metals, polymers, ceramics, and mixtures.

8. The process according to claim 1 wherein the gas in step (a) has a temperature of from about 30 to about 180° C.

9. The process according to claim 1 wherein the solvent in step (b) has a temperature of from about 35 to about 60° C.

10. The process according to claim 1 further comprising:
    (d) after said washing, recirculating and reusing the solvent from step (b).

11. The process according to claim 10 wherein recirculating includes filtering the solvent.

12. The process according to claim 10 wherein the recirculating includes coolont the solvent to a temperature of from about 10° C. to about 60° C.

* * * * *